United States Patent [19] [11] Patent Number: 6,001,887
Keup et al. [45] Date of Patent: *Dec. 14, 1999

[54] DEFOAMER EMULSION BASED ON ORGANOFUNCTIONALLY MODIFIED POLYSILOXANES

[75] Inventors: Michael Keup, Essen; Roland Sucker, Werne, both of Germany

[73] Assignee: Th. Goldschmidt AG, Essen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/668,417

[22] Filed: Jun. 21, 1996

Related U.S. Application Data

[63] Continuation of application No. 08/359,093, Dec. 19, 1994, abandoned.

[30] Foreign Application Priority Data

Dec. 17, 1993 [DE] Germany ............................. P4343185

[51] Int. Cl.$^6$ ..................................................... B01D 19/04
[52] U.S. Cl. ........................................... 516/118; 516/124
[58] Field of Search ................................. 252/321, 358; 516/118, 124

[56] References Cited

U.S. PATENT DOCUMENTS

| 3,691,091 | 9/1972 | Koerner | 516/121 |
| 3,984,347 | 10/1976 | Keil | 252/321 |
| 4,039,469 | 8/1977 | Raleigh | 516/121 |
| 4,076,648 | 2/1978 | Rosen | 516/118 |
| 4,274,977 | 6/1981 | Koerner et al. | 516/118 |
| 4,395,352 | 7/1983 | Kulkarni et al. | 252/321 |
| 4,559,162 | 12/1985 | Abel et al. | 252/321 |
| 4,639,489 | 1/1987 | Aizawa et al. | 252/321 X |
| 4,762,640 | 8/1988 | Schiefer | 252/321 |
| 4,983,316 | 1/1991 | Starch | 252/321 X |
| 5,262,088 | 11/1993 | Hill et al. | 252/321 |
| 5,380,464 | 1/1995 | McGee et al. | 252/321 |
| 5,431,853 | 7/1995 | Tsuda et al. | 252/321 |
| 5,543,082 | 8/1996 | McGee et al. | 252/321 |
| 5,556,902 | 9/1996 | Shouji et al. | 252/321 |

FOREIGN PATENT DOCUMENTS

| 0354016 | 2/1990 | European Pat. Off. . |
| 0427263 | 5/1991 | European Pat. Off. . |

*Primary Examiner*—Richard D. Lovering
*Assistant Examiner*—Daniel S. Metzmaier
*Attorney, Agent, or Firm*—Frommer Lawrence & Haug LLP

[57] ABSTRACT

A defoamer emulsion, based on organofunctionally modified polysiloxanes, is obtained by mixing one or several more closely defined organofunctionally modified siloxanes and, optionally, finely divided silica, and emulsifying the mixture by means of a low-shear stirrer with water which contains a hydrophilic, organofunctionally modified polysiloxane.

18 Claims, No Drawings

DEFOAMER EMULSION BASED ON ORGANOFUNCTIONALLY MODIFIED POLYSILOXANES

This is a continuation application of Ser. No. 08/359,093, filed Dec. 19, 1994, now abandoned.

FIELD OF INVENTION

The invention relates to defoamer emulsions based on organofunctionally modified polysiloxanes. More particularly, the invention relates also to those emulsions which contain finely divided silica.

BACKGROUND INFORMATION AND PRIOR ART

The use of methylpolysiloxanes for defoaming liquids is one of the first areas in which these products were used. There exists a large number of publications and patents wherein the mode of action of the siloxanes is described, and advice is given for selecting suitable siloxanes and the forms in which they are prepared.

It was already recognized earlier that the use of mixtures of different polysiloxanes can be advantageous. For this purpose, a large number of different organofunctionally-modified polysiloxanes have also been developed. A typical organofunctional group, which modifies the properties of the polysiloxanes, is the polyether group with oxyethylene and/or oxypropylene units. In the course of further development, polysiloxanes, with combinations of polyether groups of different hydrophilicity, were used for the modification. Finely divided, mostly pyrogenic silica, which is optionally used in the hydrophobized form, is an important component of such defoamer emulsions based on polysiloxanes.

From the large number of Offenlegungsschriften and patents relating to defoamers based on polysiloxanes, the following publications are cited as examples:

U.S. Pat. No. 3,984,347 relates to a preparation, which consists essentially of:

1. 50 to 98.9% by weight of a basic oil, which is a polyoxypropylene or a polyoxypropylene-polyoxyethylene polymer with a molecular weight of 500 to 6,000, or a siloxane glycol polymer of the general formulae (a) $(R_aSi(OSiMe_2)_n(OSiMeG)_bOSiMe_2G)_{4-a}$,
    (b) $(R_aSi(OSiMe_2)_n(OSiMeG)_rOSiMe_3)_{4-a}$,
    (c) $GMe_2Si(OSiMe_2)_n(OSiMeG)_bOSiMe_2G$, or
    (d) $Me_3Si(OSiMe_2)_n(OSiMeG)_rOSiMe_3$ wherein R is a hydrocarbon with 1 to 10 carbon atoms, free of olefinic double bonds, Me is a methyl group, G is a group having the formula $—D(OR')_mA$, in which D is an alkylene group with 1 to 30 carbon atoms and R' is an alkylene group with 2 to 10 carbon atoms, m has a value of at least 1 and A is a capping group, a has a value of 0 or 1, n has a value of at least 12, b has a value of 0 to 50, and c has a value of 1 to 50;

2. 1 to 40% by weight of a defoamer, which is obtained essentially from 88 to 95 parts by weight of a liquid polydimethylsiloxane with a viscosity of at least 20 cSt at 25° C., 5 to 10 parts by weight of silica and 0 to 20 parts by weight of a siloxane resin, which consists essentially of the units $SiO_2$ and $(CH_3)_3SiO_{1/2}$ in the ratio of 1:0.4 to 1:1.2; and 3. 0.1 to 10% by weight of a dispersant, which disperses component 2 in component 1 and is a siloxane copolymer, which either is i) a polydimethylpolysiloxane-polyether copolymer, in which the molecular weight of the polysiloxane is at least 2,000, and the polyoxypropylene polymer has a molecular weight of at least 800, or a polyoxyethylene-polyoxypropylene copolymer with a molecular weight of 1,500, the polyether being linked over an SiC bond to a silicon atom of the siloxane, or ii) a polydimethylpolysiloxane-polyether polymer, which is obtained by heating a mixture of a methyl-hydrogenpolysiloxane having a molecular weight of at least 1,500, and a polyoxypropylene glycol having a molecular weight of at least 800, or a polyoxyethylene-polyoxypropylene glycol having a molecular weight of at least 1,500.

The published European patent application 0 354 016 relates to a textile detergent which contains raw detergents, builders and at least one material for controlling the foam, with the distinguishing feature that a dispersable preparation of a silicone defoamer is contained in the detergent and consists of a non-aqueous emulsion of a primary and a secondary defoamer, the primary defoaming ingredient being a mixture of:

a) a liquid or organopolysiloxane with at least one hydroxyl and hydrocarbon group, b) a silicone resin or a compound producing a silicone resin, c) a finely divided filler, and d) a catalyst for the reaction between a) and c), the secondary defoaming ingredient being a mixture of a liquid methylpolysiloxane, at least one nonionic silicone surfactant, a first organic dispersant and a second dispersant, based on a nonionic difunctional block copolymer with terminal primary hydroxyl groups.

Finally, reference is made to the published European patent application 0 427 263, in which a silicone-based defoamer preparation is described, which contains (i) a polydiorgano-siloxane, (ii) silica, and (iii) 4 to 2500 parts by weight, based on 100 parts by weight of the sum of components (i) and (ii) of a modified silicone oil, the molecule of which has at least one functional organic group which is linked to a silicon atom, as well as at least one epoxy, amino, amide, carboxyl, alkoxyl or hydroxyl group, and at least one optionally substituted polyoxyalkylene group which is linked to a silicon atom.

Even though these known defoamers can be used advantageously to prevent or eliminate foam in aqueous systems, unfulfilled or inadequately fulfilled requirements, nevertheless, remain.

One of these requirements is to prepare defoamer emulsions which are as concentrated and stable as possible and can be diluted by the user to the desired concentration, while retaining the stability of the emulsions. This is possible with simple stirring equipment without requiring expensive stirring technology or special precautions. At the same time, the diluted emulsions must satisfy high stability requirements and should exhibit high stability particularly when subjected to temperature changes and to shaking. It is, therefore, an object of the invention to solve this technical problem.

OBJECT OF THE INVENTION

An object of the present invention is a defoamer emulsion based on organofunctionally modified polysiloxanes.

SUMMARY OF THE INVENTION

Such a defoamer can be obtained by mixing together (a) 0 to 90 parts by weight of an organopolysiloxane of the general formula

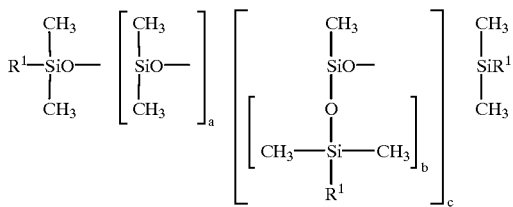

(hereinafter referred to as Formula I)
in which $R^1$ can be the same or different in the average molecule and represents an alkyl group with 1 to 8 carbon atoms, or the $-Z-(C_nH_{2n}O-)_mR^2$ group, wherein $R^2$ is a hydrogen group or an alkyl group with 1 to 8 carbon atoms, Z is a divalent group having the formula $-O-$, $-(CH_2)_p-O-$ or $-CH_2-CH(CH_3)-CH_2-O-$ with p=2 or 3, n has an average numerical value of 2.7 to 4.0, m has an average numerical value of 5 to 130, a has an average numerical value of 4 to 1,500, b has an average numerical value of 0 to 100, and c has an average numerical value of 0 to 50;

(b) 0 to 90 parts by weight of an organopolysiloxane of the general formula

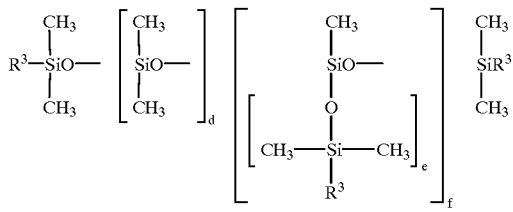

(referred hereinafter as Formula II)
in which $R^3$ can be the same or different in the average molecule and represents a hydroxyl group or alkoxy group with 1 to 4 carbon atoms, d has an average numerical value of 4 to 1,500, e has an average numerical value of 0 to 100, and f has an average numerical value of 0 to 50;

(c) 0 to 90 parts by weight of an organopolysiloxane of the general formula

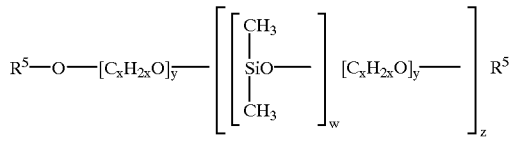

(referred to hereinafter as Formula III)
in which $R^5$ can be the same or different in the average molecule and represents an alkyl group with 1 to 4 carbon atoms, with the proviso that at least 90% of the $R^5$ groups are methyl groups, x has an average numerical value of 2.6 to 3.0, y has an average numerical value of 8 to 80, w has an average numerical value of 7 to 50, and z has an average numerical value of 1.5 to 10, the sum of the components (a), (b) and (c) being not less than 10 parts by weight and not more than 90 parts by weight; and (d) 0 to 15 parts by weight of finely divided silica, and stirring this mixture into a mixture of (e) and (f) obtained from (e) 5 to 85 parts by weight of an organopolysiloxane of the general formula

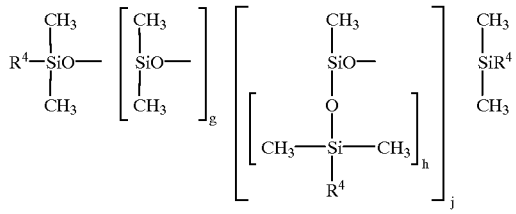

(referred to hereinafter as Formula IV)
in which $R^4$ in the average molecule can be the same or different and represents an alkyl group with 1 to 8 carbon atoms or the $-Z-(C_qH_{2q}O-)_rR^2$ group, wherein at least one $R^4$ is $-Z-(C_qH_{2q}O-)_rR^2$ and $R^2$ and Z have the meanings already given, q has an average numerical value of 2.0 to 2.7, r has an average numerical value of 5 to 120, g has an average numerical value of 4 to 200, h has an average numerical value of 0 to 100, and j has an average numerical value of 0 to 50; and (f) 5 to 50 parts by weight of water with a low-shear stirrer and thus converting this mixture into a stock emulsion, which is diluted to the desired concentration subsequently or only immediately before it is used.

In Formula I, $R^1$ preferably represents a methyl group or a polyether group, in which Z is $-O-$ or $-(CH_2)_3-O-$. In this case, the polyether group has the formula $-(CH_2)_3-O-(C_nH_{2n}O-)_mR^2$.

The average numerical value of n is 2.7 to 4.0, a numerical value of 2.7 to 3 being preferred. This average numerical value is obtained during the block-wise synthesis of the polyether or random addition reaction of corresponding amounts of ethylene oxide and propylene oxide. Optionally, higher alkylene oxides can also be used.

The average numerical value of m is 5 to 130. It indicates the average number of oxyalkylene units in the polyether group. Preferably, m has an average numerical value of 6 to 50.

$R^2$ is a hydrogen group or an alkyl group with 1 to 8 carbon atoms. Especially preferred is an alkyl group with 1 to 5 carbon atoms, particularly the butyl group. The subscripts a, b, and c preferably have the following values: a=4 to 800, b=0 to 50, c=0 to 30.

The second polysiloxane component corresponds to the general Formula II. In this polysiloxane, $R^3$ represents a hydroxyl group or a lower alkoxy group with 1 to 4 carbon atoms. The hydroxyl group is preferred and the alkoxy group is to be regarded as a precursor, which can be converted into the hydroxyl group under hydrolysis conditions.

Admittedly, the values of d, e and f are to be regarded as independent of the subscripts a, b and c. However, they correspond to the given and preferred ranges but need not be identical in the two formulas.

The third polysiloxane component corresponds to the general Formula III. In this polysiloxane, $R^5$ represents an alkyl group with 1 to 4 carbon atoms, however, with the proviso that at least 90% of the $R_5$ groups are methyl groups. The subscripts have the following average values:

x=2.6 to 30, preferably 2.8 to 3.0;

y=8 to 80, preferably 20 to 60;

w=7 to 50, preferably 13 to 30; and z=1.5 to 0, preferably 1.5 to 5.

The polysiloxanes of Formulas I, II and III can be present in the inventive defoamer emulsion in amounts of, in each case, 0 to 90 parts by weight. However, the condition that the sum of the two polysiloxanes constitutes at least 10 parts by weight but does not exceed 90 parts by weight, must be fulfilled. For example, the following combinations (aside from other combinations) are possible:

| Siloxane Type | Parts by Weight | | | | |
|---|---|---|---|---|---|
| Siloxane I   | 90 | 0  | 0  | 30 | 20 |
| Siloxane II  | 0  | 90 | 0  | 30 | 45 |
| Siloxane III | 0  | 0  | 90 | 30 | 25 |

Component d is a finely divided silica which is customarily used in defoaming emulsions as an action-enhancing substance. In general, pyrogenically produced silica is used which can also be hydrophobized by treatment with silanes. Preferably, amounts of 0.2 to 5 parts by weight are used.

As polysiloxane e with the general Formula IV, siloxanes are preferably used in which the $R^4$ groups represent an alkyl group with 1 to 4 carbon atoms and/or groups having the formula $—(CH_2)_3—O—(C_qH_{2q}O—)_2H$. In distinction from the polyether siloxanes of Formula I, the polyether group of the polyethersiloxanes IV is more hydrophilic, that is, the average value of q, ranging from 2.0 to 2.7, is lower than that of the siloxanes I. This is brought about by a higher proportion of ethylene oxide in the synthesis of the polyether. A range of 2.3 to 2.6 is particularly preferred.

From the values of the subscripts g, h and j, it is evident that the polysiloxanes of Formula IV generally have a lower molecular weight than the polysiloxanes of Formula I. The following average numerical values are preferred for the subscripts: g=4 to 100, h=0 to 20 and j=0 to 25.

The inventive defoamer emulsion can be obtained by mixing together components (a)=siloxane I, (b)=siloxane II, (c)=polysiloxane III and (d) silica and stirring this blend into the mixture of the components (e)=polysiloxane of Formula IV and (f) water by means of a low-shear stirrer.

A procedure is preferred in which the components (a), (b), (c) and (d), to begin with, are heated in the presence of an alkaline equilibrating catalyst for 0.5 to 10 hours at 50° C. to 2.00° C. An alkaline equilibrating catalyst, preferably an effective amount, about 0.5 to 2 parts by weight, of an alcoholic solution of an alkali or ammonium hydroxide or carbonate, such as an ethanolic solution of potassium hydroxide, is used.

Preferably, the equilibration is carried out for 3 to 6 hours at 90° C. to 150° C. It can be assumed that, during this reaction, there are also reactions between the polysiloxanes and reactive centers at the surface of the finely divided silica.

The mixture, so obtained, is now emulsified with the mixture of components (e) and (f) to form a stock emulsion. The latter can then be diluted to the desired concentration immediately or at a later time, if necessary, on the location where the defoamer is to be used. The concentration for use is generally 5 to 20% by weight of dispersed phase.

Despite the low water content, the stock solution, which can be diluted pursuant to the invention, has a low viscosity and can be converted in any convenient manner, for example, simply by stirring-in water into the desired, dilute emulsion used for the defoaming.

The stability of the diluted emulsions can be increased even further by diluting the stock emulsion with water, which contains a stabilizer and/or thickener. Stabilizers and/or thickeners based on a carboxyl group-containing polyacrylate are particularly preferred. For this stabilization, the pH of the aqueous solution is adjusted to a value of about 7. Such stabilizers or thickeners are commercially available and described, for example, in the German Offenlegungsschrift 39 25 220.

The stock emulsions, obtained pursuant to the invention, and the emulsions, diluted to the desired concentration, have the required stability when subjected to temperature changes and/or shaking as shown in the following Examples, it being understood that the Examples are provided by way of illustration and not by way of limitation.

EXAMPLE 1

A siloxane of Formula I (31 parts by weight, a=80, c=7, b=0 and $R^1=CH_3—$ and $—Z—(C_nH_{2n}O—)_mR^2$ in the ratio of 2:7, wherein $Z=—(CH_2)_p—O—$ with p=3 and n=2.9, m=15, $R^2=—H$), are mixed with 5 parts by weight of a siloxane of Formula II (d=300, f=0 and $R^3=—OH$) and treated with 2 parts by weight of a finely dispersed silica. After the addition of 0.5 parts by weight of a 10% methanolic solution of potassium hydroxide, the mixture, so obtained, is heated for 3 hours at 100° C.

The heated product (37 parts by weight), is added to a mixture of 30 parts by weight of a siloxane of Formula IV (g=18, h=6, j=2 and $R^4=—Z—(C_qH_{2q}O)_rR^2$ with $Z=—O—$, $R^2=C_3H_7—$ and q=2.6, r=40) and 33 parts by weight of water, and stirred with a low-shear stirrer.

EXAMPLE 2

A siloxane of Formula 1 (20 parts by weight, a=18, b=6, c=2 and $R^1=—Z(C_nH_{2n}O)_m—R^2$ with $R^2=C_3H_7—$ and n=3, m=33) is mixed with 20 parts by weight of a siloxane of formula III (x=3.0, y=51, w=15, z=4). This mixture is added to a mixture of 20 parts by weight of siloxane of formula IV (g=48, h=0, j=2 and $R^4=—Z—(C_qH_{2q}O)_rR^2$ with $z=—(CH_2)_p—O—$, p=3, $R^2=H—$ and q=2.6, r=40) and 40 parts by weight of water and stirred together with little shear.

EXAMPLE 3

A siloxane of Formula III (60 parts by weight, x=2.8, y=20, w=25 and z=2) is stirred into a mixture of 25 parts by weight of a siloxane of Formula IV (g=21, h=7, j=2 and $R^4=—Z—(C_qH_{2q}O)_rR^2$ with $Z=—O—$, $R^2=C_3H_7—$ and q=2.6, r=40) and 15 parts by weight of water.

EXAMPLE 4

A siloxane of Formula II (38 parts by weight, d=70, e=10, f=6, $R^3=—OC_2H_5$) is mixed with 2 parts by weight of a finely dispersed silica. This mixture is stirred with little shear into a mixture of 30 parts by weight of a siloxane of Formula IV (g=60, h=0, j=4 and $R^4=—Z—(C_qH_{2q}O)_rR^2$ with $Z=—CH_2—CH(CH_3)CH_2—O—$, $R^2=CH_3—$, q=2.5 and r=40), and 30 parts by weight of water.

EXAMPLE 5

A siloxane of Formula I (38 parts by weight, a=500, c=0 and $R^1=CH_3—$) is mixed with 2 parts by weight of a finely dispersed silica and stirred with little shear into a mixture of 30 parts by weight of siloxane of Formula IV (g=18, h=6, j=2 and $R^4$=—Z—$(C_qH_{2q}O)_rR^2$ with Z=—O—, $R^2$=$C_3H_7$— and q=2.6, r=40) and 30 parts by weight of water.

EXAMPLE 6

Water (80.1 parts by weight) is added to a stirred vessel and 2.5 parts by weight of a 30% dispersion of a thickener based on a polyacrylate containing carboxyl groups (commercially obtainable, for example, under the name of Acrysol RM-5) are added. 14.9 parts by weight of the emulsion of Example I are then added. This mixture is stirred with a multi-stage, impulse, counter-current agitator for 5 minutes at a peripheral speed of 3 m/s. After that, the pH of this emulsion is adjusted to a value of 7 with 2.5 parts by weight of a 5.6% sodium hydroxide solution.

EXAMPLE 7

Water (78.3 parts by weight) is added to a stirred vessel, followed by 2.5 parts by weight of 30% dispersion of a thickener based on a polyacrylate containing carboxyl groups (commercially obtainable, for example, under the name of Acrysol RM-5). After that, 16.7 parts by weight of the emulsion of Example 2 are added. This mixture is now stirred for 5 minutes with a multi-stage, impulse, counter-current agitator at a peripheral speed of 3 m/s. The pH of this emulsion is then adjusted to a value of 7 with 2.5 parts by weight of a 5.6% sodium hydroxide solution.

EXAMPLE 8

Water (83.2 parts by weight) is added to a stirred vessel, followed by 2.5 parts by weight of 30% dispersion of a thickener based on a polyacrylate containing carboxyl groups (commercially obtainable, for example, under the name of Acrysol RM-5). After that, 11.8 parts by weight of the emulsion of Example 3 are added. This mixture is now stirred for 5 minutes with a multi-stage, impulse, counter-current agitator at a peripheral speed of 3 m/s. The pH of this emulsion is then adjusted to a value of 7 with 2.5 parts by weight of a 5.6% sodium hydroxide solution.

EXAMPLE 9

Water (80.1 parts by weight) is added to a stirred vessel, followed by 2.5 parts by weight of 30% dispersion of a thickener based on a polyacrylate containing carboxyl groups (commercially obtainable, for example, under the name of Acrysol RM-5). After that, 14.9 parts by weight of the emulsion of Example 4 are added. This mixture is now stirred for 5 minutes with a multi-stage, impulse, counter-current agitator at a peripheral speed of 3 m/s. The pH of this emulsion is then adjusted to a value of 7 with 2.5 parts by weight of a 5.6% sodium hydroxide solution.

EXAMPLE 10

Water (80.7 parts by weight) is added to a stirred vessel, followed by 2.5 parts by weight of 30% dispersion of a thickener based on a polyacrylate containing carboxyl groups (commercially obtainable, for example, under the name of Acrysol RM-5). After that, 14.3 parts by weight of the emulsion of Example 5 are added. This mixture is now stirred for 5 minutes with a multi-stage, impulse, counter-current agitator at a peripheral speed of 3 m/s. The pH of this emulsion is then adjusted to a value of 7 with 2.5 parts by weight of a 5.6% sodium hydroxide solution.

EXAMPLE 11

Water (78.3 parts by weight) is added to a stirred vessel, followed by 2.5 parts by weight of 30% dispersion of a thickener based on a polyacrylate containing carboxyl groups (commercially obtainable, for example, under the name of Acrysol RM-5). After that, 16.7 parts by weight of the emulsion of Example 2 are added. This mixture is now stirred for 5 minutes with a turbine with a peripheral speed of 5 m/s. The pH of this emulsion is then adjusted to a value of 7 with 2.5 parts by weight of a 5.6% sodium hydroxide solution.

EXAMPLE 12

Water (78.3 parts by weight) is added to a stirred vessel, followed by 2.5 parts by weight of 30% dispersion of a thickener based on a polyacrylate containing carboxyl groups (commercially obtainable, for example, under the name of Acrysol RM-5). After that, 16.7 parts by weight of the emulsion of Example 2 are added. This mixture is now stirred for 5 minutes with a dissolver disk at a peripheral speed of 7 m/s. The pH of this emulsion is then adjusted to a value of 7 with 2.5 parts by weight of a 5.6% sodium hydroxide solution.

EXAMPLE 13

Water (87.3 parts by weight) is added to a stirred vessel, followed by 2.5 parts by weight of 30% dispersion of a thickener based on a polyacrylate containing carboxyl groups (commercially obtainable, for example, under the name of Acrysol RM-5). After that, 16.7 parts by weight of the emulsion of Example 2 are added. This mixture is now stirred for 5 minutes with a spatula. The pH of this emulsion is then adjusted to a value of 7 with 2.5 parts by weight of a 5.6% sodium hydroxide solution.

a) Heat Stability

To determine the heat stability, the emulsions of Examples I to 13 were kept in a 250 mL glass bottle at 60° C. in an oven and evaluated every 8 hours. The time after which no destabilization of the emulsion is detectable, is noted.

b) Shaking Stability

The shaking stability was determined by filling 80 mL of the emulsion to be tested into 100 mL glass bottles and shaking them in a shaker with a shaking frequency of 240 per minute and a deflection of 3 cm. The emulsion was checked hourly for destabilization. Emulsions with shaking stabilities of less than 2 hours could be harmed during transport. For this reason, longer shaking stabilities are desirable.

The heat stability of the emulsions of Examples I to 13 exceeded 150 hours.

The shaking stability of the emulsions of Examples I to 13 exceeded 8 hours.

The defoaming action of the emulsions of Example 7 and Examples 11 to 13, prepared with different peripheral speeds from the emulsion of Example 2, were checked in order to show that the defoaming is independent of the dilution method.

TEST METHOD:

Dilexo AM 15 (a pure acrylate dispersion of the DEA Company) is mixed with water in a ratio of 8:2 (dispersion I). Dispersion I (100 g) is added to a 250 mL beaker and the temperature is adjusted to 20° C. After that, 1% of the defoamer emulsion to be tested is added. This mixture is stirred for 1 minute at 2,500 rpm with a turbine, the diameter of which is 4 cm and which is clamped in a stirrer in such a manner that it is 0.5 cm above the bottom of the beaker. Directly after the stirring, 50 mL of the stirred dispersion I is added to a tared 50 mL measuring cylinder and weighed.

From the weight A and density of the unstirred dispersion $\sigma_D$ (1.02 g/mL), the air, stirred in, can be calculated as a percentage by volume using the following equation:

% by Volume of Air=$100-2A/\sigma_D$

| Defoamer | A (g/50 mL) | % by Volume of Air |
|---|---|---|
| Without | 36.4 | 28.6 |
| Example 7 | 46.4 | 9.0 |
| Example 11 | 46.5 | 8.8 |
| Example 12 | 46.3 | 9.2 |
| Example 13 | 46.7 | 8.4 |

We claim:
1. A stock defoamer emulsion consisting of
(I) 10 to 90 parts by weight of an organopolysiloxane composition consisting of
   (a) 0 to 90 parts by weight of an organopolysiloxane of the general formula

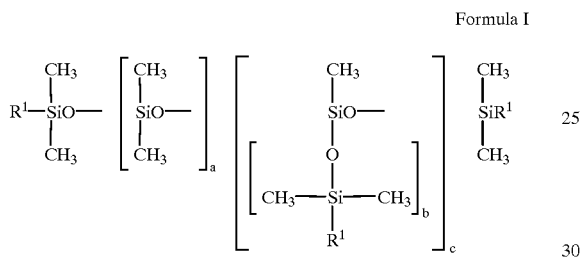

Formula I in which
   $R^1$ can be same or different in an average molecule and represents an alkyl group with 1 to 8 carbon atoms or —Z—$(C_nH_{2n}O—)_mR^2$ group, wherein
   $R^2$ is a hydrogen group or an alkyl group with 1 to 8 carbon atoms,
   Z is a divalent group having the formula —O—, —$(CH_2)_p$—O— or —$CH_2$—$CH(CH_3)$—$CH_2$—O— with p=2 or 3,
   n has an average numerical value of 2.7 to 4.0,
   m has an average numerical value of 5 to 130,
   a has an average numerical value of 4 to 800,
   b has an average numerical value of 6 to 100, and
   c has an average numerical value of 2 to 30;
   (b) 0 to 90 parts by weight of an organopolysiloxane of the general formula

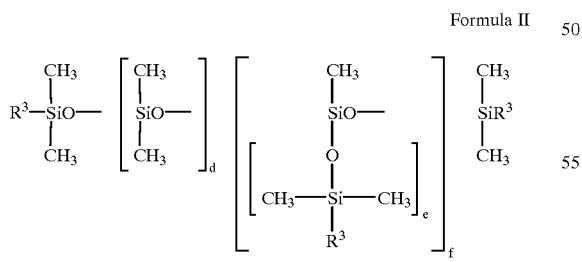

Formula II in which
   $R^3$ can be same or different in an average molecule and represents a hydroxyl group or alkoxy group with 1 to 4 carbon atoms,
   d has an average numerical value of 300 to 1,500,
   e has an average numerical value of 10 to 100, and
   f has an average numerical value of 6 to 50;

(c) 0 to 90 parts by weight of an organopolysiloxane of the general formula

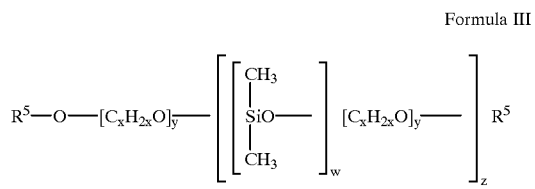

Formula III in which
   $R^5$ can be same or different in an average molecule and represents an alkyl group with 1 to 4 carbon atoms, with the proviso that at least 90% of the $R^5$ groups are methyl groups,
   x has an average numerical value of 2.6 to 3.0,
   y has an average numerical value of 20 to 80,
   w has an average numerical value of 13 to 30, and
   z has an average numerical value of 1.5 to 5,
   the sum of the components (a), (b) and (c) being not less than 10 parts by weight and not more than 90 parts by weight;
(II) 0 to 15 parts by weight of finely divided silica;
(III) 5 to 85 parts by weight of an organopolysiloxane of the general formula

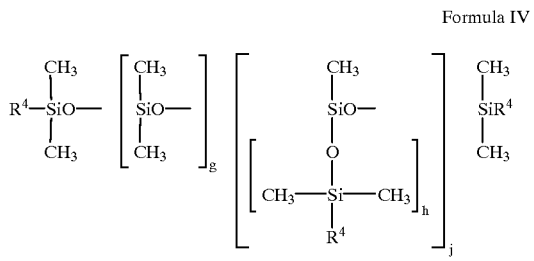

Formula IV in which
   $R^4$ in an average molecule is same or different and represents an alkyl group with 1 to 8 carbon atoms or the —Z—$(C_qH_{2q}O—)_rR^2$ group, wherein at least one $R^4$ is —Z—$(C_qH_{2q}O—)_rR^2$ group and
   $R^2$ and Z have the meanings already given,
   q has an average numerical value of 2.0 to 2.7,
   r has an average numerical value of 5 to 120,
   g has an average numerical value of 18 to 200,
   h has an average numerical value of 6 to 100,
   j has an average numerical value of 2 to 50; and
(IV) 0 to 50 parts by weight of water
   wherein the organopolysiloxane composition is first optionally equilibrated with the silica in the presence of an equilibrium catalyst for 0.5 to 10 hours at 50° C. to 200° C. before adding the organopolysiloxane of formula IV,
   with the proviso that the organopolysiloxane of Formula IV is more hydrophilic than the organopolysiloxane of Formula I.
2. A stock defoamer emulsion according to claim 1, wherein
   a is 18 to 80;
   c is 2 to 7;
   g is 18 to 60;
   h is 6 to 7;

j is 2 to 4; and m is 6 to 50.

3. A stock defoamer emulsion according to claim 1, wherein no silica is present.

4. In a method of preparing a defoaming emulsion comprising water, a stabilizer and/or a thickener, the improvement which comprise adding the stock defoamer emulsion according to claim 1 to a dispersion comprising water, stabilizer and/or a thickener.

5. The method according to claim 4 wherein the thickener is a polyacrylate containing carboxyl groups.

6. A stock defoamer emulsion consisting of
(I) 10 to 90 parts by weight of an organopolysiloxane composition consisting of
(a) 0 to 90 parts by weight of an organopolysiloxane of the general formula

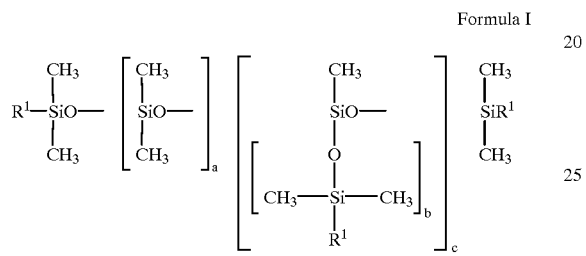

Formula I in which
$R^1$ can be same or different in an average molecule and represents an alkyl group with 1 to 8 carbon atoms or $-Z-(C_nH_{2n}O-)_mR^2$ group, wherein
$R^2$ is a hydrogen group or an alkyl group with 1 to 8 carbon atoms,
Z is a divalent group having the formula $-O-$, $-(CH_2)_p-O-$ or $-CH_2-CH(CH_3)-CH_2-O-$ with p=2 or 3,
n has an average numerical value of 2.7 to 4.0,
m has an average numerical value of 5 to 130,
a has an average numerical value of 4 to 1,500,
b has an average numerical value of 6 to 100, and
c has an average numerical value of 2 to 50;
(b) 0 to 90 parts by weight of an organopolysiloxane of the general formula

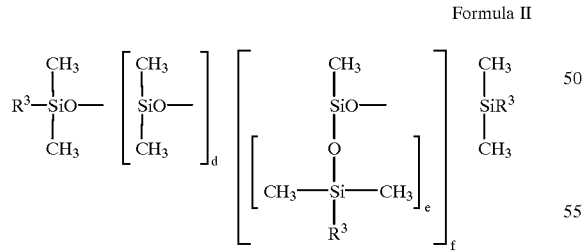

Formula II in which
$R^3$ can be same or different in an average molecule and represents a hydroxyl group or alkoxy group with 1 to 4 carbon atoms,
d has an average numerical value of 4 to 1,500,
e has an average numerical value of 10 to 100, and
f has an average numerical value of 6 to 100;
(c) 0 to 90 parts by weight of an organopolysiloxane of the general formula

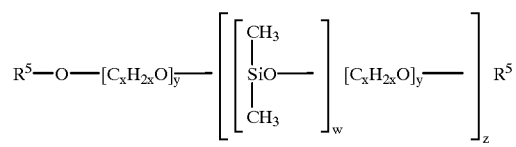

Formula III in which
$R^5$ can be same or different in an average molecule and represents an alkyl group with 1 to 4 carbon atoms, with the proviso that at least 90% of the $R^5$ groups are methyl groups,
x has an average numerical value of 2.6 to 3.0,
y has an average numerical value of 8 to 80,
w has an average numerical value of 7 to 50, and
z has an average numerical value of 1.5 to 10,
the sum of the components (a), (b) and (c) being not less than 10 parts by weight and not more than 90 parts by weight;
(II) 0 to 15 parts by weight of finely divided silica;
(III) 5 to 85 parts by weight of an organopolysiloxane of the general formula

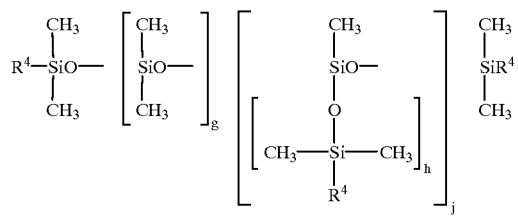

Formula IV in which
$R^4$ in an average molecule is same or different and represents an alkyl group with 1 to 8 carbon atoms or the $-Z-(C_qH_{2q}O-)_rR^2$ group, wherein at least one $R^4$ is $-Z-(C_qH_{2q}O-)_rR^2$ group and $R^2$ and Z have the meanings already given,
q has an average numerical value of 2.0 to 2.7,
r has an average numerical value of 5 to 120,
g has an average numerical value of 4 to 200,
h has an average numerical value of 0 to 100,
j has an average numerical value of 0 to 50; and
(IV) 0 to 50 parts by weight of water
wherein the organopolysiloxane composition is first optionally equilibrated with the silica in the presence of an equilibrium catalyst for 0.5 to 10 hours at 50° C. to 200° C. before adding the organopolysiloxane of formula IV,
with the proviso that the organopolysiloxane of Formula IV is more hydrophilic than the organopolysiloxane of Formula I.

7. A stock defoamer emulsion according to claim 6, which consists of
(I) 40 parts by weight of an organopolysiloxane composition consisting of
(a) 20 parts by weight of a siloxane of Formula I wherein
$R^1$ is $-Z(C_nH_{2n}O)_m-R^2$
$R^2$ is $C_3H_7$, and
n =3 m=33;
a is 18;
b is 6; and
c is 2;
(b) 20 parts by weight of a siloxane of Formula III wherein
x is 3.0;
y is 51;
w is 15, and
z is 4;
(III) 20 parts by weight of a siloxane of formula IV wherein
$R^4$ is $Z-(C_qH_{2q}O)_rR^2$ where
$R^2$ is H,
Z is $-(CH_2)_p-O-$ and p is 3,
q is 2.6, and
r is 40;
g is 48;
h is 0;
j is 2; and
(IV) 40 parts by weight of water.

8. A stock defoamer emulsion according to claim 6, which consists of
(I) 60 parts by weight of an organopoly siloxane composition consisting of a siloxane of Formula III, wherein
x is 2.8;
y is 20;
w is 25; and
z is 2; and
(III) 25 parts by weight of a siloxane of Formula IV wherein
$R^4$ is $-Z-(C_qH_{2q}O)_rR^2$ where
$R^2$ is $C_3H_7$,
Z is $-O-$,
q is 2.6, and
r is 40;
g is 21;
h is 7; and
j is 2; and
(IV) 15 parts by weight of water.

9. A stock defoamer emulsion according to claim 6, which consists of
(I) 38 parts by weight of an organopolysiloxane composition consisting of a siloxane of Formula II, wherein
$R^3$ is $OC_2H_5$;
d is 70;
e is 10; and
f is 6;
(II) 2 parts by weight of silica;
(III) 30 parts by weight of a siloxane of Formula IV wherein
$R^4$ is $-Z-(C_qH_{2q}O)_rR^2$ wherein,
$R^2$ is $CH_3$,
Z is $-CH_2-CH(CH_3)CH_2-O-$,
q is 2.5, and
r is 40;
g is 60;
h is 0; and
j is 4; and
(IV) 30 parts by weight of water.

10. In a method for preparing a defoaming emulsion comprising water, a stabilizer and/or thickener, the improvement which comprises adding the stock defoamer emulsion according to claim 6, to a dispersion comprising water, stabilizer and/or thickener.

11. A stock defoamer emulsion consisting of
(I) 10 to 90 parts by weight of an organopolysiloxane composition consisting of
(a) 0 to 90 parts by weight of an organopolysiloxane of the general formula Formula I

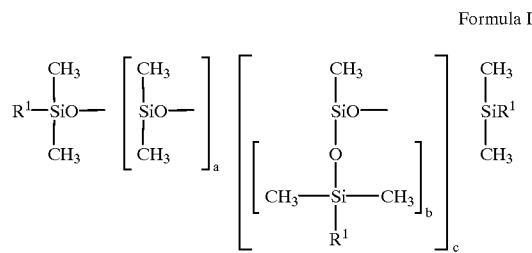

in which
$R^1$ can be same or different in an average molecule and represents an alkyl group with 1 to 8 carbon atoms or $-Z-(C_nH_{2n}O-)_mR^2$ group, wherein
$R^2$ is a hydrogen group or an alkyl group with 1 to 8 carbon atoms,
Z is a divalent group having the formula $-O-$, $-(CH_2)_p-O-$ or $-CH_2-CH(CH_3)-CH_2-O-$ with p=2 or 3,
n has an average numerical value of 2.7 to 4.0,
m has an average numerical value of 5 to 130,
a has an average numerical value of 4 to 1,500,
b has an average numerical value of 0 to 100, and
c has an average numerical value of 0 to 50;
(b) 0 to 90 parts by weight of an organopolysiloxane of the general formula Formula II

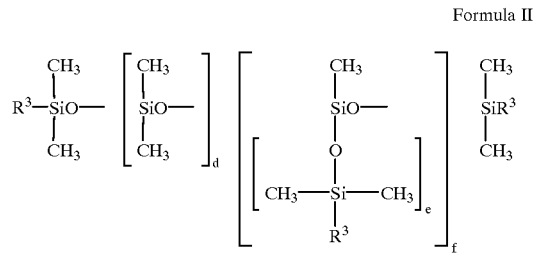

in which
$R^3$ can be same or different in an average molecule and represents a hydroxyl group or alkoxy group with 1 to 4 carbon atoms,
d has an average numerical value of 4 to 1,500,
e has an average numerical value of 0 to 100, and
f has an average numerical value of 0 to 50;
(c) 0 to 90 parts by weight of an organopolysiloxane of the general formula Formula III

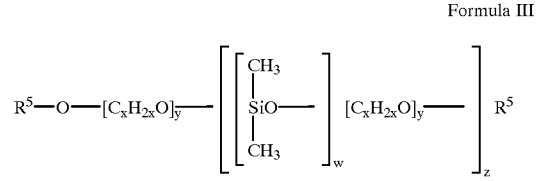

in which
$R^5$ can be same or different in an average molecule and represents an alkyl group with 1 to 4 carbon atoms, with the proviso that at least 90% of the $R^5$ groups are methyl groups, x has an average numerical value of 2.6 to 3.0,
y has an average numerical value of 8 to 80,
w has an average numerical value of 7 to 50, and
z has an average numerical value of 1.5 to 10,
the sum of the components (a), (b) and (c) being not less than 10 parts by weight and not more than 90 parts by weight;

(II) 0 to 15 parts by weight of finely divided silica;
(III) 5 to 85 parts by weight of an organopolysiloxane of the general formula Formula IV $$R^4-\underset{\underset{CH_3}{|}}{\overset{\overset{CH_3}{|}}{Si}}O-\left[\underset{\underset{CH_3}{|}}{\overset{\overset{CH_3}{|}}{Si}}O-\right]_g\left[\underset{\underset{\underset{\underset{R^4}{|}}{Si}}{|}}{\overset{\overset{CH_3}{|}}{Si}}O-\right]_j \underset{\underset{CH_3}{|}}{\overset{\overset{CH_3}{|}}{Si}}R^4$$

in which
$R^4$ in an average molecule is same or different and represents an alkyl group with 1 to 8 carbon atoms or the $-Z-(C_qH_{2q}O-)_rR^2$ group, wherein at least one $R^4$ is $-Z-(C_qH_{2q}O-)_rR^2$ group and $R^2$ and Z have the meanings already given,
q has an average numerical value of 2.0 to 2.7,
r has an average numerical value of 5 to 120,
g has an average numerical value of 18 to 200,
h has an average numerical value of 6 to 100,
j has an average numerical value of 2 to 50; and (IV) 0 to 50 parts by weight of water
wherein the organopolysiloxane composition is first optionally equilibrated with the silica in the presence of an equilibrium catalyst for 0.5 to 10 hours at 50° C. to 200° C. before adding the organopolysiloxane of formula IV,
with the proviso that the organopolysiloxane of Formula IV is more hydrophilic than the organopolysiloxane of Formula I.

12. A stock defoamer emulsion according to claim 11, which consist of
(I) 37 part by weight of an organopolysiloxane composition consisting of
(a) 31 parts of a siloxane of Formula I wherein
$R^1$ is $CH_3$ and $Z-(C_nH_{2n}O-)_m-R^2$ in the ratio of 2:7;
$R^2$ is hydrogen;
Z is $-(CH_2)_p-O-$ where p is 3;
n is 2.9; and
m is 15;
a is 80;
b is 0;
c is 7;
(b) 5 parts by weight of a siloxane of Formula II wherein
$R^3$ is OH;
d is 300;
f is 0;
(II) 2 parts by weight of silica;
(III) 30 parts by weight of a siloxane of Formula IV wherein $R^4$ is $-Z-(C_2H_{2q}O)_rR^2$ where
$R^2$ is $C_3H_7$;
Z is $-O-$;
q is 2.6;
r is 40;
g is 18;
h is 6;
j is 2; and
(IV) 33 parts by weight of water
wherein the organopolysiloxane composition is first equilibrated with the silica in 0.5 parts by weight of a 10% methanolic solution of potassium hydroxide for 3 hours at 100° C.

13. A stock defoamer emulsion according to claim 11, which consists of
(I) 38 parts by weight of an organopolysiloxane composition consisting of an organopolysiloxane of formula I wherein
$R^1$ is $CH_3$;
a is 500;
b is 0; and
c is 0;
(II) 2 parts by weight of silica;
(III) 30 parts by weight of a siloxane of Formula IV wherein
$R^4$ is $-Z-(C_qH_{2q}O)_rR^2$, wherein
$R^2$ is $C_3H_7$
Z is $-O-$, and
q is 2.6
g is 18;
h is 6; and
j is 2; and
(IV) 30 parts by weight of water.

14. In a method for preparing a defoaming emulsion comprising water, a stabilizer and/or thickener, the improvement which comprises adding the stock defoamer emulsion according to claim 11, to a dispersion comprising water, stabilizer and/or thickener.

15. A stock defoamer emulsion based on organofunctionally modified polysiloxanes, obtained by mixing together a mixture consisting of
(a) 0 to 90 parts by weight of an organopolysiloxane of the general formula Formula I $$R^1-\underset{\underset{CH_3}{|}}{\overset{\overset{CH_3}{|}}{Si}}O-\left[\underset{\underset{CH_3}{|}}{\overset{\overset{CH_3}{|}}{Si}}O-\right]_a\left[\underset{\underset{\underset{\underset{R^1}{|}}{Si}}{|}}{\overset{\overset{CH_3}{|}}{Si}}O-\right]_b \underset{\underset{CH_3}{|}}{\overset{\overset{CH_3}{|}}{Si}}R^1$$

in which
$R^1$ can be same or different in an average molecule and represents an alkyl group with 1 to 8 carbon atoms or $-Z-(C_nH_{2n}O-)_mR^2$ group, wherein
$R^2$ is a hydrogen group or an alkyl group with 1 to 8 carbon atoms,
Z is a divalent group having the formula $-O-$, $-(CH_2)_p-O-$ or $-CH_2-CH(CH_3)-CH_2-O-$ with p=2 or 3,
n has an average numerical value of 2.7 to 4.0,
m has an average numerical value of 5 to 130, a has an average numerical value of 4 to 1,500,
b has an average numerical value of 0 to 100, and
c has an average numerical value of 0 to 50;

(b) 0 to 90 parts by weight of an organopolysiloxane of the general formula

Formula II $$R^3\text{—SiO—}\left[\begin{array}{c}CH_3\\|\\ \text{SiO—}\\|\\ CH_3\end{array}\right]_d \left[\begin{array}{c}CH_3\\|\\ \text{SiO—}\\|\\ O\\|\\ CH_3\text{—Si—}CH_3\\|\\ R^3\end{array}\right]_f \begin{array}{c}CH_3\\|\\ \text{SiR}^3\\|\\ CH_3\end{array}$$

(with $CH_3$ groups on the terminal Si shown as $R^3$—SiO— with $CH_3$ substituents)

in which
   $R^3$ is the same or different in an average molecule and represents a hydroxyl group or alkoxy group with 1 to 4 carbon atoms,
   d has an average numerical value of 4 to 800,
   e has an average numerical value of 6 to 100, and
   f has an average numerical value of 20 to 30;

(c) 0 to 90 parts by weight of an organopolysiloxane of the general formula

Formula III $$R^5\text{—O—}[C_xH_{2x}O]_{\overline{y}}\text{—}\left[\left[\begin{array}{c}CH_3\\|\\ \text{SiO—}\\|\\ CH_3\end{array}\right]_w [C_xH_{2x}O]_y\text{—}\right]_z R^5$$

in which
   $R^5$ is the same or different in an average molecule and represents an alkyl group with 1 to 4 carbon atoms, with the proviso that at least 90% of the $R^5$ groups are methyl groups,
   x has an average numerical value of 2.8 to 3.0,
   y has an average numerical value of 20 to 80,
   w has an average numerical value of 13 to 30, and
   z has an average numerical value of 1.5 to 5, the sum of the components (a), (b) and (c) being not less than 10 parts by weight and not more than 90 parts by weight; and (d) 0 to 15 parts by weight of finely divided silica and stirring the mixture thus obtained into a second mixture consisting of (e) 5 to 85 parts by weight of an organopolysiloxane of the general formula Formula IV $$R^4\text{—SiO—}\left[\begin{array}{c}CH_3\\|\\ \text{SiO—}\\|\\ CH_3\end{array}\right]_g \left[\begin{array}{c}CH_3\\|\\ \text{SiO—}\\|\\ O\\|\\ CH_3\text{—Si—}CH_3\\|\\ R^4\end{array}\right]_{h,j} \begin{array}{c}CH_3\\|\\ \text{SiR}^4\\|\\ CH_3\end{array}$$

in which
   $R^4$ in an average molecule is same or different and represents an alkyl group with 1 to 8 carbon atoms or the —Z—$(C_qH_{2q}O$—$)_rR^2$ group, wherein at least one $R^4$ is —Z—$(C_qH_{2q}O$—$)_rR^2$ group and $R^2$ and Z have the meanings already given,
   q has an average numerical value of 2.0 to 2.7,
   r has an average numerical value of 5 to 120,
   g has an average numerical value of 18 to 200,
   h has an average numerical value of 6 to 100,
   j has an average numerical value of 20 to 50; and (f) 5 to 50 parts by weight of water, with a stirrer with the proviso that the organopolysiloxane of Formula IV is more hydrophilic than the organopolysiloxane of Formula I.

16. A stock emulsion according to claim 15, wherein the stirrer is a low-shear stirrer.

17. A stock defoamer emulsion according to claim 15, wherein no silica is present.

18. A stock defoamer emulsion according to claim 15, wherein the mixing is done in presence of 0.2 to 15 parts by weight of finely divided silica.

* * * * *